US009643348B2

(12) United States Patent
    Guven

(10) Patent No.: US 9,643,348 B2
(45) Date of Patent: May 9, 2017

(54) METHOD FOR RECYCLING WASTE THERMOPLASTIC MATERIALS AND USING THIS RECYCLED THERMOPLASTIC IN COMPOSITE MATERIAL PRODUCTION

(76) Inventor: Ali Hakan Guven, Ankara (TR)

( * ) Notice: Subject to any disclaimer, the term of this patent is extended or adjusted under 35 U.S.C. 154(b) by 557 days.

(21) Appl. No.: 14/344,061

(22) PCT Filed: Nov. 10, 2011

(86) PCT No.: PCT/TR2011/000265
    § 371 (c)(1),
    (2), (4) Date: Mar. 11, 2014

(87) PCT Pub. No.: WO2013/070176
    PCT Pub. Date: May 16, 2013

(65) Prior Publication Data
    US 2014/0339726 A1    Nov. 20, 2014

(51) Int. Cl.
    *B29C 45/00*    (2006.01)
    *B29B 7/88*    (2006.01)
    (Continued)

(52) U.S. Cl.
    CPC ............ *B29C 45/0001* (2013.01); *B29B 7/88* (2013.01); *B29B 17/02* (2013.01); *B29B 17/04* (2013.01); *B29B 17/0404* (2013.01); *B29C 45/0013* (2013.01); *B29C 45/1816* (2013.01); *B29C 45/7207* (2013.01); *B29C 47/0004* (2013.01); *B29C 47/004* (2013.01); *B29C 47/0011* (2013.01); *B29C 47/0894* (2013.01); *B29C 47/1018* (2013.01); *B29C 47/1063* (2013.01); *C08J 11/04* (2013.01); *C08J 11/06* (2013.01); *B29B 7/90* (2013.01); *B29B 17/0042* (2013.01); *B29B 2017/0231* (2013.01); *B29B 2017/0289* (2013.01); *B29C 47/1027* (2013.01);
    (Continued)

(58) Field of Classification Search
    CPC B29B 7/88; B29B 17/02; B29B 17/04; B29B 17/0404; B29C 45/0001; B29C 45/0013; B29C 45/1816; B29C 45/7207; B29C 47/0004; B29C 47/0011; B29C 47/0894; B29C 47/1018; B29C 47/1063; C08J 11/04; C08J 11/06
    See application file for complete search history.

(56) References Cited

U.S. PATENT DOCUMENTS 5,143,308 A * 9/1992 Hally .................. B03B 5/28
                                                209/44.1
5,225,476 A * 7/1993 Sperk, Jr. ................ C08K 7/02
                                                524/507

FOREIGN PATENT DOCUMENTS

DE    1454804 A1    2/1969
DE    3710418 A1    9/1988
(Continued)

*Primary Examiner* — Joseph S Del Sole
*Assistant Examiner* — John Robitaille
(74) *Attorney, Agent, or Firm* — Gokalp Bayramoglu

(57) ABSTRACT

This invention is related to a method for production of high strength and low cost thermoplastic composite materials by processing and treating waste plastic materials with some minerals. The object of the invention is to embody a recycling method wherein it contains high amounts of additives and therefore composite materials with high strength properties are obtained. Another object of the invention is to embody a recycling method wherein high amounts of additives are used in the production and the machines used in the production are not damaged.

1 Claim, 2 Drawing Sheets

(51) Int. Cl.
    *B29B 17/02*     (2006.01)
    *B29C 47/10*     (2006.01)
    *C08J 11/04*     (2006.01)
    *C08J 11/06*     (2006.01)
    *B29C 47/00*     (2006.01)
    *B29C 47/08*     (2006.01)
    *B29B 17/04*     (2006.01)
    *B29C 45/18*     (2006.01)
    *B29C 45/72*     (2006.01)
    *B29K 105/00*     (2006.01)
    *B29B 7/90*     (2006.01)
    *B29B 17/00*     (2006.01)
    *B29K 101/12*     (2006.01)
    *B29K 105/26*     (2006.01)
    *B29K 509/00*     (2006.01)

(52) U.S. Cl.
    CPC .. *B29C 2045/0096* (2013.01); *B29K 2101/12* (2013.01); *B29K 2105/0005* (2013.01); *B29K 2105/26* (2013.01); *B29K 2509/00* (2013.01); *Y02P 20/143* (2015.11); *Y02P 70/263* (2015.11); *Y02W 30/62* (2015.05); *Y02W 30/622* (2015.05); *Y02W 30/70* (2015.05); *Y02W 30/701* (2015.05)

(56) References Cited

FOREIGN PATENT DOCUMENTS

| | | |
|---|---|---|
| DE | 102005051341 A1 | 4/2007 |
| GB | 2076728 A | 12/1981 |
| JP | 07178732 A * | 7/1995 |

\* cited by examiner

METHOD FOR RECYCLING WASTE THERMOPLASTIC MATERIALS AND USING THIS RECYCLED THERMOPLASTIC IN COMPOSITE MATERIAL PRODUCTION

FIELD OF THE INVENTION

This invention is related to a method for production of high strength and low cost thermoplastic composite materials by processing and treating waste plastic materials with some minerals.

BACKGROUND OF THE INVENTION

Nowadays, since the cost of materials such as wood, metal, iron, gypsum etc. is high, composite materials that can be substituted for the above mentioned materials are produced.

Thermoplastic composite materials are mainly produced by processing plastic materials and adding various chemical and other additives into the plastics. The aim of these additions is to improve the mechanical and chemical properties of the thermoplastic materials without increasing costs. Nevertheless, the manufactured thermoplastics do not have the desired cost. This situation also makes it harder to use these materials in construction and building industries.

Now recycling methods are also used in obtaining thermoplastic composite materials. It is more preferable to obtain plastic materials that will be used in the thermoplastic composite materials from the waste plastics collected from the garbage, both from an economical and an environmental point of view. However, when materials on the waste plastics such as dirt, oil, chemicals etc. can not be removed completely, the quality of the obtained thermoplastic composite material gets lower.

The recycling methods of the waste plastic materials mainly consist of the following steps; separation of the waste plastics from the foreign materials, cutting the plastic materials into small pieces, melting and casting into desired molds, cooling and obtaining the desired product. Besides, various thermoplastic composite materials are produced by adding additives to plastic materials during this above mentioned melting process.

In the Japanese patent document No. JP 2007130885 of the known state of the art, a high strength, good endurance and long life composite material production system is disclosed. In this method, the emphasized process is primarily to determine the amount and size of the additive that will be given to the plastic. Secondly, the amount and type of the additive is determined. The $3^{rd}$ step is about melting the mixture and controlling the pre-determined amount and type of the additive of the mixture formed in the mold.

In the Japanese patent document No. JP 2009132939 of the known state of the art, a durable composite material production technique is disclosed wherein waste plastic materials are used as raw material and additives are mixed in. The recyclable plastic first contains polymer and secondly polymer and residual additives.

In the Japanese patent document No. JP 2010234812 of the known state of the art, a high strength, good endurance and long life plastic mold production method is disclosed by employing various techniques and methods. For recycling waste plastic materials that contains 2 or more additives, the waste material is separated from the foreign materials, then melted and molded, respectively. The metal is separated from the plastic by mixture filtration method and after determination of the type and amount of additive, the separated metal and the additives are added to the recyclable plastic.

In the Japanese patent document No. JP 2004042461 of the known state of the art, the management of the processes such as washing off the dirt, oil, earth, undesired chemicals and food wastes on the waste plastics that contain foreign materials, separation and drying is disclosed. The recyclable plastic material is powdered in a liquid by cutting into small pieces. Then the plastic material is adhered or the materials contained within are separated from the plastic. The materials that indicate their positions are separated by liquid separation, plastic or plastic melting.

However, the amount of additives that will be mixed into the plastic materials is very important for the strength of the products to be obtained. When more additives (chemicals or minerals) can be added, the strength of the obtained material becomes proportionally higher. But, as high amounts of additives are mixed into the waste plastics, the melting of this mixture becomes more problematic. Usually these procedures are performed in extruder machines. In extruders, plastic waste materials and additives are fed in and composite material in dough form is obtained. In this situation, when a high amount of additive is mixed into the mixture, wearing and break downs occur in the machines, when the additives are used in low amounts the materials can not achieve the desired strength properties.

In the plastic processing machines that are used in the known state of the art that run by systems such as injection and extrusion, the working principle is forcing the melted material under pressure to exit through a hole. In the system, there is a feeding zone (a cone or a side feeding screw), a worm gear (also called as an Archimedes screw, it has compression and pushing tasks) and a cylindrical body (shell) where the gear moves inside and that can resist high pressures and temperatures up to 500° C. This situation increases the production and operation costs of the machine.

Moreover, in the plastic processing machines that are used in the known state of the art that run by systems such as injection and extrusion, more wearing occurs on the machines since the filler materials that have hard and abrasive properties are fed starting from the thermoplastic feeding zone. This situation increases the maintenance and repairment costs of the machine.

Furthermore, in the plastic processing machines that are used in the known state of the art that run by systems such as injection and extrusion, when the melted mixture reaches the compression zone, it can not be compressed since the minerals are not compressible and it causes the gear to be jammed or broken by generating very high counter torque forces. Therefore, high amounts of minerals are not used in melted thermoplastic mixtures and the mixture can not reach the desired strength value.

Moreover, in the plastic processing machines that are used in the known state of the art that run by systems such as injection and extrusion, very special molds need to be used. The price of these molds is very high.

Furthermore, in the plastic processing machines that are used in the known state of the art that run by systems such as injection and extrusion, the material is injected into the mold by the machine itself and also the required pressure is generated by the machine itself. Therefore, these machines are very complicated and expensive.

Moreover, in the plastic processing machines that are used in the known state of the art that run by systems such as injection and extrusion, since the molds are attached to the machine, the machines should not work while the material is cooling in the mold. As a result, these system runs by a start and stop principle and their production capacity is low.

Another problem is waiting the cool-down period after pressing the plastic material in dough form into a mold. In this situation, the machines can not run until the composite material in the mold cools.

SUMMARY OF THE INVENTION

The object of the invention is to embody a recycling method for waste plastics of which the production costs are decreased.

Another object of the invention is to embody a recycling method wherein the waste plastics are cleaned from the materials on them such as dirt, oil, chemicals etc.

Yet another object of the invention is to embody a recycling method wherein it contains high amounts of additives and therefore composite materials with high strength properties are obtained.

Yet another object of the invention is to embody a recycling method wherein high amounts of additives are used in the production and the machines used in the production are not damaged.

Yet another object of the invention is to embody a recycling method that provides low energy consumption.

The method of recycling waste plastic materials and using these recycled plastics in composite material production which is performed in order to achieve the objects of the invention comprises the steps of;

Releasing a number of types of baledthermoplastic waste materials by feeding into a bale opening machine (110), Feeding the waste plastic materials into a separation unit and in there separation from rocks, earth, sand and other coarse foreign materials (120), Feeding the waste plastic material into the cutting machine, cutting the waste plastic material into small pieces through high speed blades and at the same time washing by injecting water into the machine (130), Feeding the waste plastic materials cut into small pieces to a muddy water separation machine and separation of slimed material from the muddy water by centrifugal forces (140), Transferring the material into a pool filled with water, rinsing in there and at the same time precipitation of sand and other heavy materials that may have left on it (150), Transferring the material into the organic contamination separation machine and here cleaning of the oil and other organic foreign materials on the material that can not be removed in the previous processes by centrifugal forces (160), Transferring the material to the water separation machine and there separating the water and moisture on the material by centrifugal forces (170), Storing the material by transferring to storage silos (180), Transferring the material into the drying machine and here drying the material by heating and at the same time powdering it by crinkling for easy feeding to machines in the future processes (190), Storing the dried and crinkled material by transferring to storage silos (200), Transferring the material to the horizontal reactor (210), Heating the material in the horizontal reactor under pressure up to 350° C. temperature (220), Adding the painter and the compatibilizer chemical materials to the material heated in the horizontal reactor through a side feeding unit (230), Adding mineral materials, through another side feeding unit, to the material in which painter and compatibilizer chemical materials have been added and which is being heated in the horizontal reactor (240), Heating the plastic material until linear links are broken, cross links are established and materials are relinked to each other at the molecular level (250), Immediately pouring the melted composite material exiting from the horizontal reactor into the molds before it cools down and cooling under pressure by compression inside the mold (260).

DETAILED DESCRIPTION OF THE INVENTION

Figure 1:
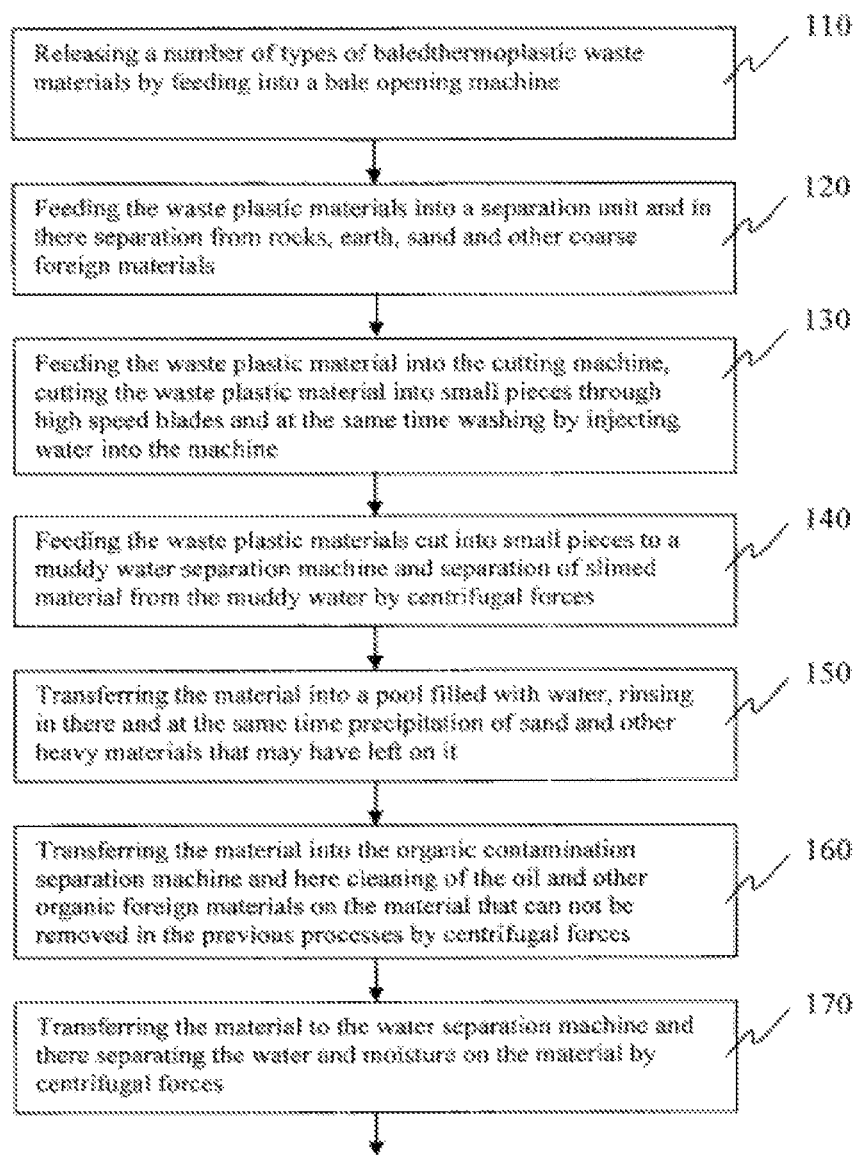
FIG. 1 is the first part of the flow chart of the method.
Figure 2:
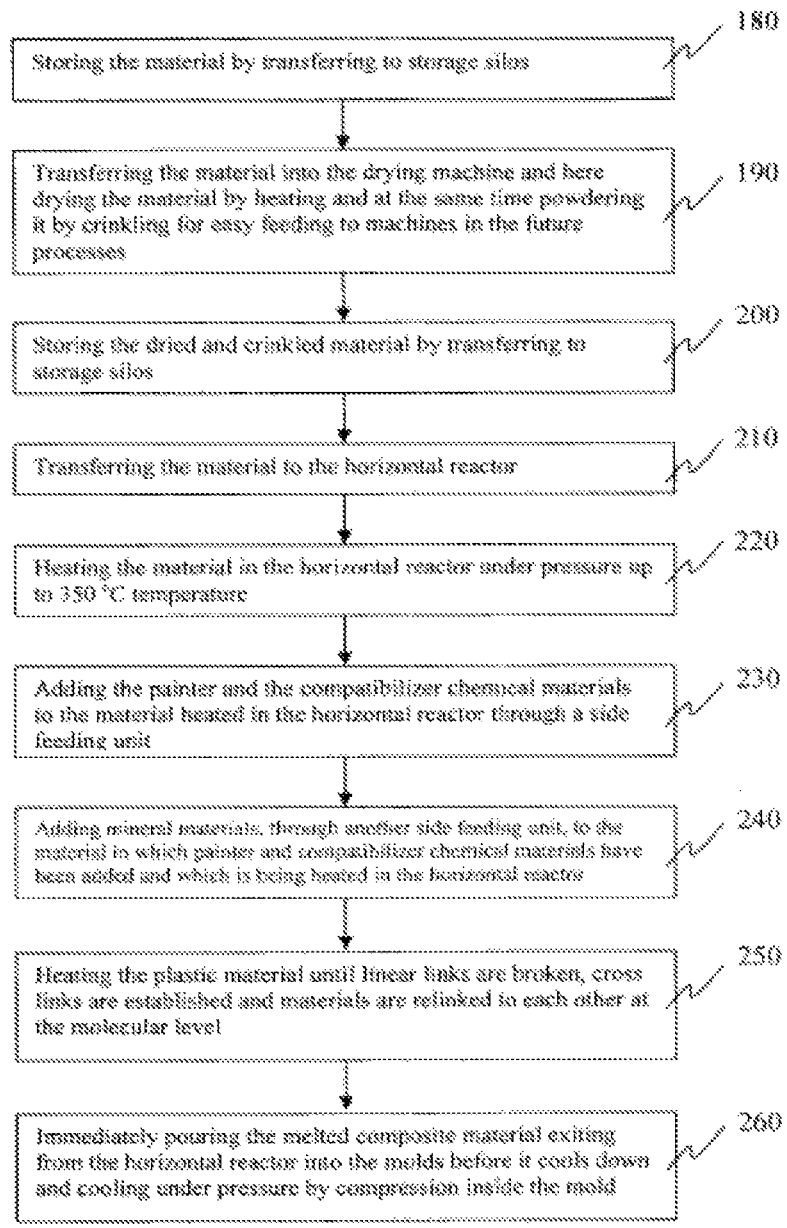
FIG. 2 is the second part of the flow chart of the method.

The method of recycling waste plastic materials and using these recycled plastic materials in composite material production which is performed in order to achieve the object of the invention is illustrated in appended FIGURES, wherein;

First, a number of types of thermoplastic waste plastic material are fed into a bale opening machine and the compressed waste plastic material is released. (110)

The waste plastic materials is fed into a separation unit and in there separated from rocks, earth, sand and other coarse foreign materials. (120)

The waste plastic material is fed into the cutting machine, the waste plastic material is cut into small pieces through high speed blades and at the same time washed by injecting water into the machine. (130)

The waste plastic materials cut into small pieces are fed to a muddy water separation machine and the slimed material is separated from the muddy water by centrifugal forces. (140)

Then the material is transferred into a pool filled with water, rinsed in there and at the same time sand and other heavy materials that may have left on it is precipitated. (150)

The material is transferred into the organic contamination separation machine and here the oil and other organic foreign materials on the material that can not be removed in the previous processes are cleaned off by centrifugal forces. (160)

The material is transferred to the water separation machine and there the water and moisture on the material is separated by centrifugal forces. (170)

Then the material is stored by transferring to storage silos. (180)

The material is transferred into the drying machine and here the material is dried by heating and at the same time powdered by crinkling for easy feeding to machines in the future processes. (190)

The dried and crinkled material is stored by transferring to storage silos. (200)

The material is transferred to the horizontal reactor. (210)

The material is heated in the horizontal reactor under pressure up to 350° C. temperature. (220)

The painter and the compatibilizer chemical materials are injected to the material heated in the horizontal reactor through a side feeding unit. (230)

The mineral materials are injected to the system through another side feeding unit. (240)

The mixture is continuously mixed and heated until the linear links of the plastic material is broken and branched, cross links form and materials are relinked to each other at molecular level and the reaction is waited to end. (250)

The melted composite material exiting from the horizontal reactor is immediately poured into the molds before it cools down and cooled under pressure by compression inside the molds. (260)

In the method according to the invention, a high amount of additives can be added to the thermoplastics since there is no compression after the filler material is added and no large counter torques are generated.

In the system according to the invention, the loss of energy for heating is prevented by adding the filler material in the reaction stage after the plastic materials are melted and unnecessary energy consumption for the filler materials is prevented.

In the system according to the invention, the wearing on the machines is minimized since the filler materials and the minerals are fed into the reactor after the plastic materials are melted.

The method according to the invention provides a huge amount of energy saving. In the plastic processing machines that are currently in use that work by systems such as injection and extrusion, the filler material is initially fed into the machines with the thermoplastic materials and the mixture is required to be heated up to the melting temperature of the thermoplastics. Here energy must be consumed for heating both the thermoplastics and the filler materials. In the system according to the invention, no energy must be consumed for heating the filler materials since the filler materials are fed into the system at a later stage.

In the method according to the invention, the melted composite material exiting from the horizontal reactor is immediately poured into the molds and cooled under pressure by compression. A multiple-mold system is employed depending on the capacity of the horizontal reactor and the cooling time of the melted composite material in the mold. The molds are placed sequentially, one mold is filled and left to cool and the next molds is processed. The compression in the molds is performed by hydraulic presses. Non flooding compression molding method is used in the system. By this method, the plastic material that has a large volume with a certain weight is compressed in the mold by pressure into the molding cavity with a smaller volume. In the non flooding compression molds, the driving punch is matched to the mold cavity as in a cylinder-piston system.

In the method according to the invention, the molds are simple and produced very cheaply since the non flooding compression molding method is used.

In the method according to the invention, since the pressure required for compressing the molds is provided by the hydraulic presses which are separate parts of the system, the machines in the system are not required to be very complicated and thus the investment costs are low.

In the method according to the invention, since the molds that are used are not attached to the machine and a multiple mold system is employed, the other machines continue to run while the material is cooling in the mold. As a result, the method according to the invention runs by continuous working principle and the production capacity is high.

The invention claimed is:

1. A method for recycling waste plastic materials and using this recycled plastic in composite material production, comprises the steps of:

Releasing a number of types of compressed thermoplastic waste materials by feeding into a bale opening machine;

Feeding the waste plastic materials into a separation unit and in there separation from rocks, earth, sand and other coarse foreign materials;

Feeding the waste plastic material into a cutting machine, cutting the waste plastic material into small pieces through high speed blades and at the same time washing by injecting water mm the machine;

Feeding the waste plastic materials cut into small pieces to a muddy water separation machine and separation of a slimed material from muddy water by centrifugal forces;

Transferring the waste plastic material into a pool filled with water, rinsing in there and at the same time precipitation of sand and other heavy materials that may have left on it;

Transferring the waste plastic material into an organic contamination separation machine and here cleaning of oil and other organic foreign materials on the waste plastic material that can not be removed in the previous processes by centrifugal forces;

Transferring the waste plastic material to a water separation machine and there separating the water and moisture on the waste plastic material by centrifugal forces;

Storing the waste plastic material by transferring to storage silos;

Transferring the waste plastic material into a drying machine and here drying the waste plastic material by heating and at the same time powdering it by crinkling for easy feeding to machines in future processes;

Storing the dried and crinkled waste plastic material by transferring to storage silos;

Transferring the waste plastic material to a horizontal reactor;

Heating the waste plastic material in the horizontal reactor until it melts under pressure up to 350° C. temperature;

Adding a painter and compatibilizer chemical materials to the waste plastic material heated in the horizontal reactor through a side feeding unit;

Adding mineral materials, through another side feeding unit in the horizontal reactor, to the melted waste plastic material in which the painter and the compatibilizer chemical materials have been added;

Further heating and mixing the melted waste plastic material with additives to form a melted composite material;

Immediately pouring the melted composite material free flowing from the horizontal reactor into independent detached molds before it cools down and cooling under pressure by compression inside the independent detached molds by means of individual hydraulic presses.

* * * * *